Aug. 4, 1964 M. E. DAVIES 3,143,048
PHOTOGRAPHIC APPARATUS
Filed March 16, 1959 3 Sheets-Sheet 1
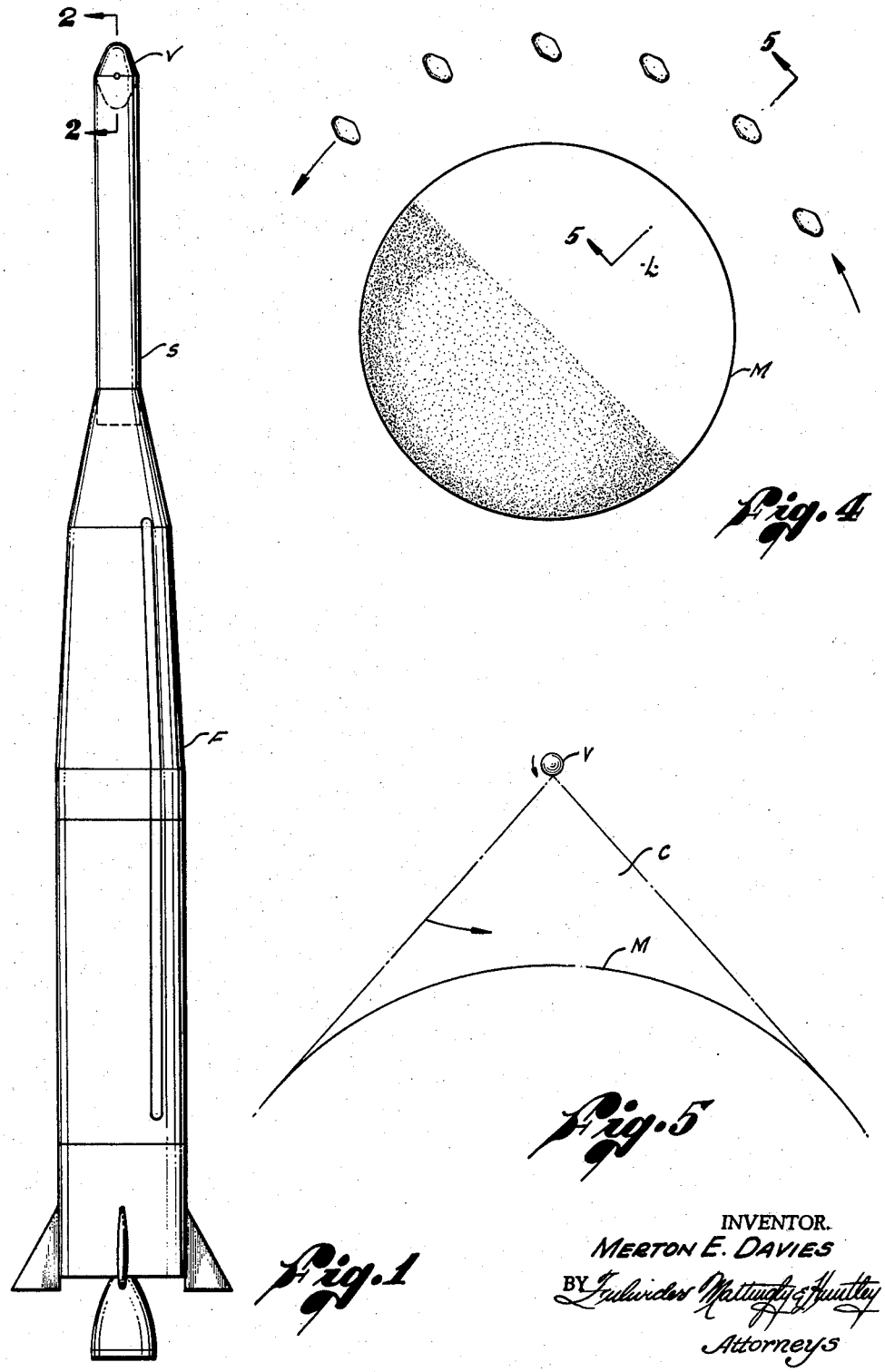
INVENTOR.
MERTON E. DAVIES
BY Fulwider Mattingly & Huntley
Attorneys Aug. 4, 1964 M. E. DAVIES 3,143,048
PHOTOGRAPHIC APPARATUS
Filed March 16, 1959 3 Sheets-Sheet 2
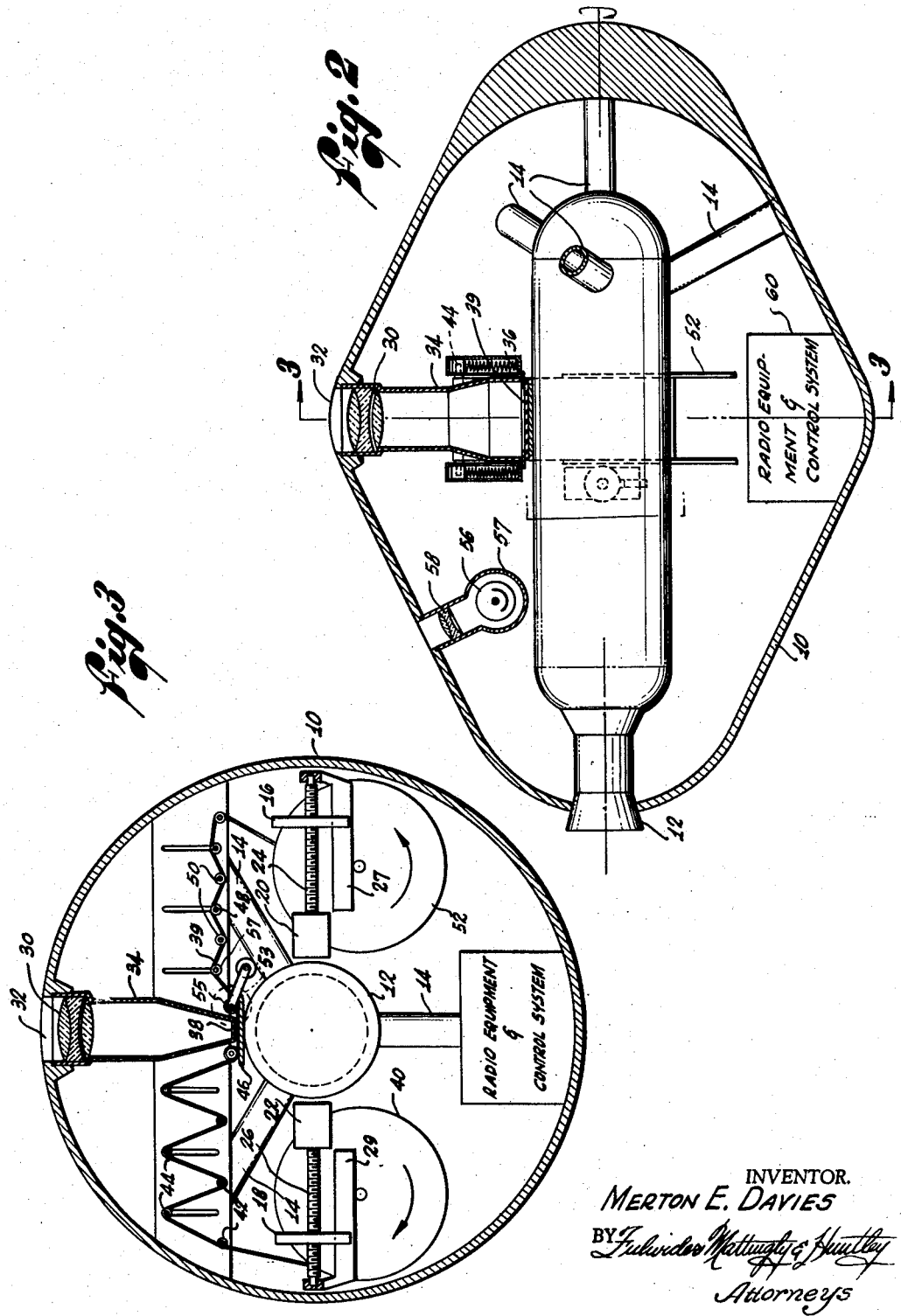
INVENTOR.
MERTON E. DAVIES
BY
Attorneys Aug. 4, 1964
M. E. DAVIES
3,143,048
PHOTOGRAPHIC APPARATUS
Filed March 16, 1959
3 Sheets-Sheet 3
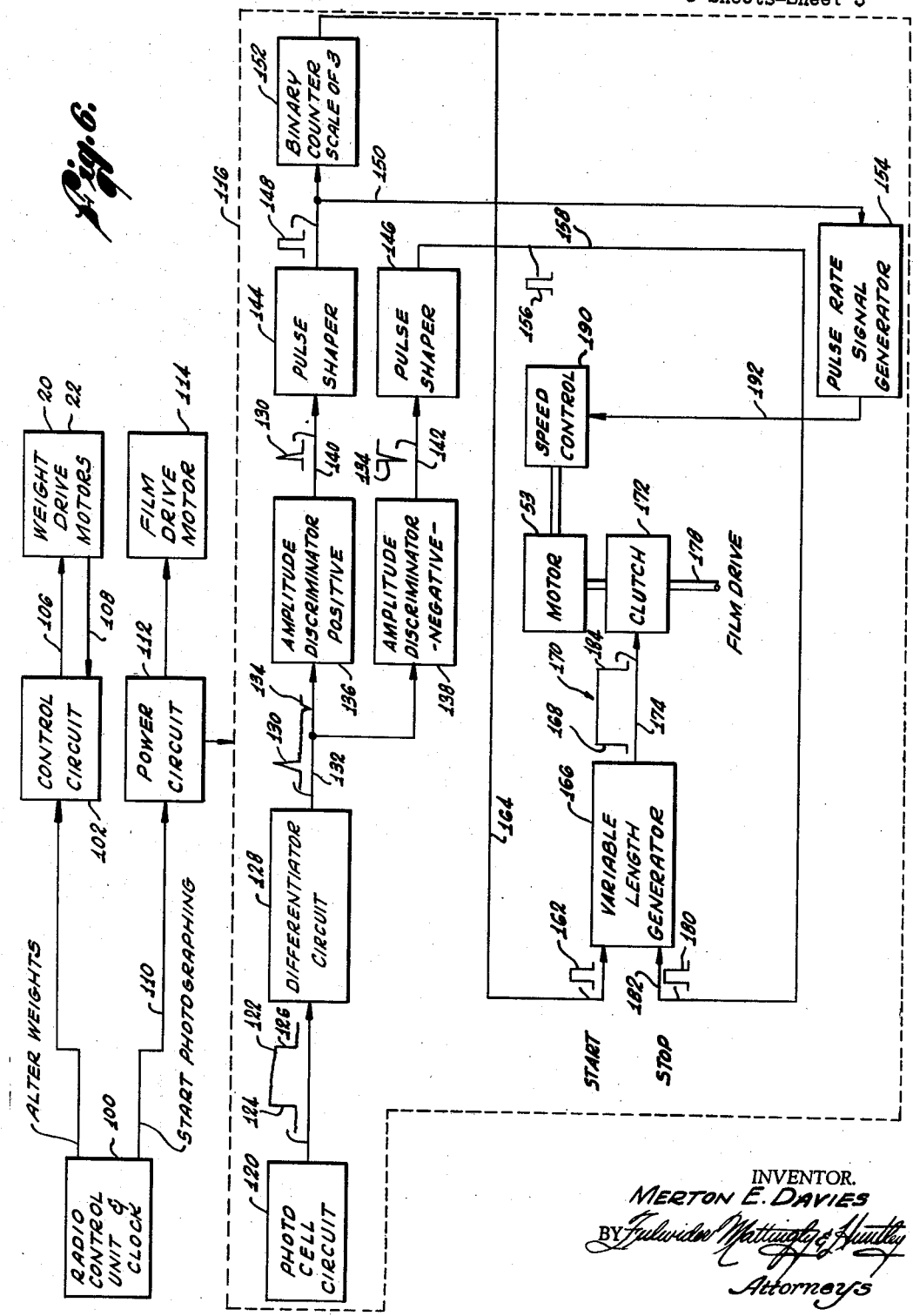
INVENTOR.
MERTON E. DAVIES
BY Fulwider Mattingly & Huntley
Attorneys

3,143,048
PHOTOGRAPHIC APPARATUS
Merton E. Davies, Santa Monica, Calif., assignor to The Rand Corporation, Santa Monica, Calif., a non-profit corporation of California
Filed Mar. 16, 1959, Ser. No. 799,618
12 Claims. (Cl. 95—12.5)

The present invention relates to a photographic apparatus and particularly to such an apparatus which is adapted to be freely projected over an area of interest in order to photograph the area while in flight.

Recent developments in the conquest of space have stimulated additional interest in the earth's moon. Of course, the moon has been a subject of study for centuries and continuing efforts have existed to glean lunar information. For example, one method of studying the moon has been to take lunar photographs with large telescopes. However, in general, photographs of this type do not provide sufficient resolution to accurately determine the character of the moon's surface. Furthermore, the far side of the moon (always being remote from earth) has never been observed, photographed or studied by man. Therefore, any detailed information on the surface of the near side of the moon, or any information at all relative to the far side of the moon could be extremely valuable in the future conquest of space.

Although the moon has been selected as an exemplary subject for the disclosed embodiment of the present invention, it will be readily apparent that embodiments of the present invention may also be adapted for use to survey and study other spatial bodies including inaccessible areas of the earth.

In general, any proposal to photograph an inaccessible area by projecting a camera-containing vehicle over the area gives rise to many problems. One of the major problems is the stabilization of the vehicle during the photographing operation. Another significant problem is the provision of complex film-handling equipment and similarly complex scanning equipment in a relatively-light apparatus which can be projected.

In general, the present invention comprises a photographic apparatus for surveying inaccessible areas by projecting a vehicle over the areas. The vehicle is stabilized by imparting spin thereto and the spin of the vehicle is utilized to scan the camera over the area to be photographed. The focusing means of the camera, which scans a surface as the vehicle spins, forms an image upon film, behind a shutter containing a narrow slit through which the film is exposed. The film is driven at a rate governed by the rate of spin or roll rate of the vehicle so that the film moves at the same rate as the imaged subject area and is exposed as the subject area is scanned.

An object of the present invention is to provide an improved means for studying and surveying inaccessible areas.

Another object of the present invention is to provide an improved photographic apparatus, adapted to be freely projected over an inaccessible area to form a pictorial record thereof.

Still another object of the present invention is to provide an apparatus for photographing inaccessible locations which apparatus is relatively inexpensive.

A further object of the present invention is to provide an apparatus for photographing spatial bodies which is relatively simple in structure and may be constructed to have relatively light weight.

Still a further object of the present invention is to provide a surface-surveying apparatus adapted to be projected over an inaccesible area. The apparatus is stabilized by spinning it, and thereby scans the area and photographs it.

These and other objects and advantages will become apparent from the following description taken in conjunction with the following drawings of an embodiment thereof, in which:

FIGURE 1 is a perspective view of an apparatus constructed in accordance with the principles of the present invention shown with projecting means;

FIGURE 2 is a vertical sectional view along line 2—2 of FIGURE 1;

FIGURE 3 is a horizontal sectional view along line 3—3 of FIGURE 2;

FIGURE 4 is a diagrammatic representation of one path through which an apparatus of the present invention may be projected to survey a portion of the moon;

FIGURE 5 is a sectional view along line 5—5 of FIGURE 4; and

FIGURE 6 is a diagrammatic representation of the control system incorporated in an apparatus constructed in accordance with the present invention.

Referring initially to FIGURE 1, there is shown a camera-carrying vehicle V mounted to comprise the nose cone in a propulsion system including a first stage rocket F and a second stage rocket S. The details of the vehicle V are explained hereinafter with respect to FIGURES 2, 3 and 6; however, preliminarily a possible projection path of the vehicle will be considered.

As previously indicated, the present invention is applicable to study various inaccessible areas, and one area of considerable current interest is the surface of the moon. A vehicle V constructed in accordance with the present invention and propelled by the rocket configuration shown in FIGURE 1, could photograph the far side of the moon. For example, using a Thor-type missile as a booster, a vehicle V of approximately 80 pounds could be sent to the moon. If an Atlas-type missile were used as a booster, the payload could be considerably increased.

The rocket stages S and F form no basic part of the present invention and are shown only to illustrate one means of projecting the vehicle V. The last-stage rocket serving to propel the vehicle V upon its journey, e.g. stage S, may incorporate vernier rockets or other apparatus to spin the rocket stage, as is well known in the prior art. One form of such apparatus was employed in the recent Pioneer I and Pioneer III lunar vehicles. If the entire last-stage of the rocket is spun, the spin imparted to the rocket also spins the vehicle V, which upon release from the last stage, continues to spin at a relatively high rate. It is the spin of the vehicle which is utilized both to stabilize the vehicle V and to scan the subject surface.

A trajectory of the vehicle V about the moon M is illustrated in FIGURES 4 and 5. Of course, a variety of trajectories exist over the moon each of which would provide information of considerable interest; however, the trajectory of FIGURE 4, would provide information relative to the far side L of the moon (illustrated to be illuminated).

In the trajectory of FIGURE 4, the vehicle V would reach a point within three thousand miles distance of the moon and return to earth in a free fall. As the vehicle V approaches the illuminated far side L of the moon in the illustrated trajectory, it is spinning about its axis as indicated. Therefore, a lens or other focusing means mounted in the vehicle V is moved to scan the surface of the moon M, and cover a pattern formed by sweeps as indicated by the sweep C in FIGURE 5. That is, as the vehicle V revolves in a counterclockwise direction, as indicated in FIGURE 5, the camera in the vehicle is moved through a helical pattern to repeatedly scan the surface of the moon. Of course, as a result of the linear motion of the vehicle, along the path illustrated in FIGURE 4, fresh areas of the moon are repeatedly scanned by the sweeping camera, to produce a record of the area over which the vehicle passes.

The vehicle V constructed in accordance with the principles of the present invention will now be considered in detail. Referring to FIGURE 2, there is shown a casing or housing 10 for the vehicle V, which may be formed of various materials capable of withstanding projection and of protecting the elements therein. If the vehicle is to fall back to earth at a high velocity, the housing 10 will normally be coated with ablating plastic which vaporizes to keep the vehicle from overheating during re-entry.

A rocket 12 is centrally mounted in the housing 10, as by support braces 14 and may be employed to alter the path of the vehicle to obtain a better trajectory in the vicinity of the area being photographed, or as another example, to facilitate re-entry in a predetermined area. Of course, the rocket 12 may serve to alter the path of a vehicle V differently in different applications. The rocket 12 is adapted to be fired by remote control in accordance with well-known techniques, and other similar rockets may also be provided.

In addition to varying the course of the vehicle, it may be desirable to alter the roll rate. For example, the rate of spin or roll rate required to stabilize the stage S, especially when S contains a solid propellant, will probably be higher than the roll rate required to stabilize the vehicle V. Therefore, movable weights 16 and 18 are provided to alter the moment of inertia of the vehicle after burnout of stage S and separating stage S from vehicle V, to thereby control the roll rate of vehicle V. The position of the weights 16 and 18 is controlled by motors 20 and 22 respectively, which are connected to turn screws 24 and 26 respectively. The weights 16 and 18 may comprise various equipment in the vehicle, for example, electrical storage batteries may be incorporated in the weights.

The weights 16 and 18 are held against rotation by sliding engagement with brackets 27 and 29 which extend parallel to the screws 24 and 26. The brackets 27 and 29 may incorporate potentiometers which provide signals indicative of the position of the weights, which signals are employed in a system for placing the weights in a selected position as will be considered hereinafter. The details of these potentiometers are well known in the prior art and will not be considered herein.

Turning now to a consideration of the camera apparatus in the vehicle, reference will continue to be had to FIGURES 2 and 3. A lens system 30 is mounted adjacent a quartz window 32 affixed in the housing 10. The lens 30 may, for example, be a 12-inch focal length, highly corrected F/3.5 lens covering a fairly narrow angle of some 21 degrees. The lens system 30 is mounted in a light passage 34 terminating at a wall 36 which is positioned substantially at the focal plane of the lens system. The wall 36 contains a narrow slit 38 (FIGURE 3) through which film 39 is exposed to record the surface of interest.

During the photographing operation of the camera in the vehicle V, the film 39 is moved from a reel 40, over a series of the stationary rollers 42 and spring-mounted rollers 44, across a pressure plate 46 positioned adjacent the slit 38. The film then moves over spring-mounted rollers 48 and stationary rollers 50 to be received on a spool 52.

In the operation of the camera (control of which will be described hereinafter in detail) the spools 40 and 52 are driven continuously. However, motor 53, driving a roller 55 and pivotally-mounted with the roller 55 on an arm 57 is coupled to the roller 55 only intermittently. That is, the motor 53 incorporates an electrically-operated clutch (not shown) which intermittently engages the motor to the roller 55. Therefore, as the film is drawn past the slit 38, it is accumulated upon the rollers 48 and 50, so as to be later taken up by the continuously moving spool 52.

In the normal operation of this system, it will be desirable to expose only one length of film for several revolutions or rolls of the vehicle V. That is, normally the relationship between the capability of the camera and the speed of the vehicle will be such that the subject surface will be covered if the camera is operated to photograph a scan only once during several revolutions of the vehicle.

In order to control the camera so that the film is exposed only during part of a revolution, and not necessarily during every revolution and to maintain the film speed determined by the roll rate of the vehicle V as it relates to the body being photographed, a control system is provided. The control system employs a photoelectric cell 56 mounted in a housing 57 with a lens 58. The housing 57 extends into the vehicle housing 10 so that light or other radiation may strike the photocell 56 to form a control electrical signal which indicates sharp variations in light intensity presented as the vehicle revolves.

In the event that the vehicle V is employed to photograph the moon as described with respect to FIGURES 1, 4 and 5, the sharp variations in the light signal may indicate the horizon of the moon which serves as a control reference for the camera apparatus. The electrical system associated with the photoelectric cell 56 may be embodied in housing 60 variously mounted within the vehicle along with other circuits which will now be considered in detail with reference to FIGURE 6.

The electrical system incorporated in the illustrative embodiment of the present invention may be best explained by assuming a cycle of operation and introducing the component circuits of FIGURE 6, as the explanation of the cycle of operation progresses. Assuming that the vehicle V has been projected and is approaching an area to be surveyed, e.g., the far side L of the moon, the vehicle will normally have a roll rate somewhat in excess of that required to stabilize the vehicle. Therefore, it will be desirable to reduce the roll rate by moving the weights 16 and 18 outward. This movement is accomplished by transmitting a signal to a control unit 100, which is decoded to control the weight-drive motors 20 and 22 through a control circuit 102. The weight-drive motors 20 and 22 (shown as a single block in FIGURE 6) receive a signal from the control circuit 102 through a conductor 106 and provide a different signal back to the control circuit 102 through a conductor 108. The control circuit 102 and the weight-drive motors 20 and 22 may take various forms of servo systems well known in the prior art. However, in general, the control circuit 102 receives a signal indicative of a desired placement for the weights 16 and 18 (FIGURE 3) and the motors respond to correctly position the weights. The motors 20 and 22 may incorporate a sliding contact potentiometer (as previously described with respect to FIGURE 3) to provide an amplitude signal in conductor 108 which is indicative of the existing position of the weights 16 and 18. The control circuit 102 may then provide driving current to the motors through conductor 106 until the amplitude of the signal in the line 108 substantially coincides to the amplitude of a signal applied to the control circuit from the radio control unit which signal is indicative of a selected setting for the weights. Thus, the weights 16 and 18 are moved outwardly to a selected position to reduce the roll rate of the vehicle V preparatory to the photographing operation.

Also, preliminary to the photographing operation, the component circuits of the control system are energized. A signal is transmitted to the radio control unit 100 and decoded therein to provide an energizing signal through a conductor 110 to a power unit 112 which supplies electrical energy to the continuously-running film-drive motors 114 (serving to drive the reels 40 and 52, FIGURE 3) and to a control system 116 (which serves to control the intermittent movement of the roller 55 to actually draw the film 39 through the camera system).

Energization of component circuits in the control system 116 initiates operation of the photocell circuit 120 to provide a signal 122 indicative of the light intensity about the vehicle V. In the event the vehicle V is passing over the light side of the moon, the signal 122 will be at one level as the cell 120 scans the moon and at a substantially different level when the photocell is directed away from the moon. These levels in this signal are separated by a leading edge 124 and a trailing edge 126 which actually indicate the horizons of the moon.

The signal 122 is applied to a differentiator circuit 128 which may comprise a simple resistance-capacitance differentiator or various other well known circuits for performing the analog differentiation operation. The circuit 128 forms a positive pulse 130 in a conductor 132 which is indicative of the leading edge 124 in the signal 122 and a negative pulse 134 appearing in conductor 132, which pulse is indicative of the trailing edge 126 in the signal 122.

The conductor 132 is connected to a pair of amplitude discriminators 136 and 138. These discriminators may comprise various well known trigger circuits and simply function to pass signals which exceed a predetermined amplitude level and otherwise provide a reference-level signal. The amplitude discriminator 136 is a positive discriminator and selectively passes positive pulses above a predetermined amplitude. The discriminator 138 operates in a similar manner to pass negative pulses below a predetermined amplitude. The threshold amplitude of the circuits 136 and 138 is set to pass pulses 130 to a conductor 140 and pulses 134 to a conductor 142. Therefore, pulses 130 and 134 appear respectively in conductors 140 and 142 to manifest the relationship between the horizons of the moon and the rotation displacement of the vehicle V.

The pulses 130 and 134 are applied respectively to pulse-shaper circuits 144 and 146 respectively, which may comprise monostable multivibrators or various well known circuits capable of generating a regularly formed pulse. The pulse-shaper circuit 144 produces a pulse 148 in a conductor 150 which is connected to a binary counter 152 and a pulse-rate signal generator 154. The pulse-shaper circuit 146 produces a pulse 156 in conductor 158 which is coupled to a variable pulse-length generator 166.

The pulse 148 applied to the binary counter 152 is indicative of the time when the movement of the vehicle V begins to scan the lens system 30 across the moon M as illustrated by the cone C in FIGURE 4. Therefore, it is desirable that at this instant, the operation of the camera be initiated to move the film 39 at a rate coinciding to the relative motion of the surface of the moon M to the aperture 38.

As previously explained, the capacity of the lens 30 will normally be such that it will be desirable to operate the camera only during certain revolutions of the vehicle. For example, it may be desirable to perform a photographing operation every third cycle of the vehicle V. The binary counter 152 functions to accomplish this selective operation and applies a pulse 162 to a conductor 164 only upon receiving three of the pulses 148. The binary counter 152 may take various forms and include simply three interconnected two-state devices as transistor flip-flop circuits.

The appearance of the pulse 162 in the conductor 164 indicates the beginning of an operating interval during which film is to be exposed. The pulse 162 is applied to a variable-length pulse generator 166 which upon receiving the pulse 162 produces the leading edge 168 in an operating-interval pulse 170. The variable-length pulse generator 166 may comprise a bi-stable multivibrator circuit well known in the prior art which is set in a state to provide the pulse 170 upon receiving the pulse 162.

The pulse 170 is applied to an electrically operated clutch 172 through a conductor 174 and serves to energize the clutch to couple a motor 53 to a shaft 178 which is directly connected to the roller 55 (FIGURE 3). Therefore, the roller 55 is revolved to rapidly draw a length of the film 39 past the aperture 38 for exposure to the moon surface in synchronism with the rotation of the vehicle V relative to the moon. The synchronization of the speed of the film 39 to the rate of rotation of the vehicle V is effected by controlling the speed of the motor 53 as will be hereinafter described.

With the energization of the motor 53, the length of film 39 which is positioned between the rollers 142 and 144 is drawn past the aperture 138 to draw the rollers 144 adjacent the rollers 142. Substantially at the instant when the rollers 144 close upon the rollers 142 (indicating a predetermined amount of film has been drawn past the aperture 138) a pulse 180 appears from the pulse-shaper 146 to indicate that the lens system 32 has been turned away from the surface (above the horizon) of the moon. The pulse 180 is applied to the variable-length pulse generator 166 and causes the pulse generator 166 to change in state whereby to form the trailing edge 184 of the pulse 170. Upon the occurrence of the trailing edge of the pulse 170, the clutch 172 disengages the motor 53 from the shaft 178 thereby halting further movement of the roller 55 serving to take up the film 39. It may therefore be seen that the film in the camera apparatus is drawn past the aperture 38 and exposed in sections during controlled intervals as the lens system 30 repeatedly scans the surface of the moon.

As indicated above, the movement of the film is to take place at a rate corresponding to the scan rate of the surface being photographed. This movement is controlled by a speed-control circuit 190 connected to the pulse-rate signal generator 154 through a conductor 192. The pulse-rate signal generator 154 receives pulses 148, each of which is indicative of a rotation by the vehicle V. That is, the pulses 148 indicate the photocell 56 has been revolved past a horizon of the moon and thereby serve to indicate revolutions of the vehicle V. The pulses 148 are formed into a rate-indicative analog signal by the pulse-rate signal generator 154, which may for example, comprise an integrator circuit for integrating the pulses 148 into a continuous signal. The continuous signal from the generator 154 is applied to the speed control system 190 through a conductor 192. The control system 190 may comprise a variety of well known speed control apparatus capable of regulating the speed of the motor 176 in accordance with the amplitude of a received signal. Therefore, the repetition rate of the pulses 148, indicative of the roll rate of the vehicle V, is converted to a continuous signal in the conductor 192 (the amplitude of which is indicative of the roll rate of the vehicle V) which serves to control the speed of the motor 53 through the speed control system 190. It may therefore be seen that the motor 53 is driven at a speed determined by the roll rate of the vehicle V. Of course, the speed of the motor 53 is regulated to draw the film 39 past the aperture 38 at a speed which neutralizes the effect of the spin imparted to the vehicle V.

After a consideration of the above, it may be seen that an embodiment of the present invention may be employed to photograph inaccessible areas, and that an important feature of the invention resides in the employment of the stabilizing rotation of a camera-carrying vehicle to scan a surface for photographing.

While the forms of the invention shown and described herein are fully capable of achieving the objects and providing the advantages hereinbefore stated, it will be realized that they are capable of some modification without departure from the spirit of the invention. For this reason, I do not mean to be limited to the forms shown and described, but rather to the scope of the appended claims.

I claim:
1. A photographic apparatus for surveying a spatial body comprising: a vehicle adapted to be freely projected about said spatial body while rotating about a spin axis of said vehicle; camera means mounted in said vehicle for rotation therewith about said spin axis to scan said body as said vehicle spins; means for sensing the scan rate of said camera means; and means for moving film past the exposure aperture of said camera means at a speed corresponding to the said scan rate of said camera.

2. A photographic apparatus for surveying a spatial body comprising: a vehicle adapted to be freely projected about said spatial body while rotating about a spin axis of said vehicle; camera means mounted in said vehicle for rotation therewith to scan said body as said vehicle spins; indicating means for indicating the rotational position of said vehicle about said spin axis with reference to said body; and means controlled by said indicating means for moving film past the exposure aperture of said camera means at a speed corresponding to the scan rate of said camera.

3. Photographic apparatus for surveying a spatial body comprising: a vehicle adapted to be freely projected over said spatial body while rotating about a spin axis of said vehicle; camera means mounted in said vehicle for rotation therewith to scan said body as said vehicle spins; a radiation sensitive device for sensing horizons of said body to form an electrical signal; and means for moving film past the exposure aperture of said camera at a rate determined by said electrical signal.

4. Apparatus according to claim 3 and further including remotely controlled means to selectivity start and stop said means for moving film through said camera.

5. Photographic apparatus for surveying a spatial body comprising: a vehicle adapted to be projected over said body and caused to rotate about a spin axis passing through said vehicle as said vehicle passes over said body; camera means within said vehicle, at least a portion of the optical axis of said camera means being substantially perpendicular to said spin axis and rotating with said vehicle about said spin axis to scan said body as said vehicle moves across said body; and means for moving film past the exposure aperture of said camera means at a rate to compensate for the movement of the image of said body, whereby the image of a point on said body does not move with respect to said film.

6. Photographic apparatus of the type defined in claim 5 having internal means operable to vary the rate of rotation of said vehicle about its spin axis.

7. Photographic apparatus of the type defined in claim 5 having means selectively operable to control the movement of said film, whereby selected areas of said body may be photographically scanned.

8. Photographic apparatus of the type defined in claim 5 in which said camera means includes an optical system adapted to focus an image of said body at a focal plane; and an aperture plate having said exposure aperture therein, located at said focal plane.

9. Photographic apparatus of the type defined in claim 5 in which propulsion means are located to alter the path of said vehicle after it has been projected.

10. A method for surveying the surface of a spatial body comprising the steps of: passing photographic means over the area to be surveyed; continuously rotating said photographic means about a spin axis passing through said means, whereby said photographic means scans said area in a series of sweeps; moving the photographic record material within said photographic means in synchronism with the movement of the scanning image of said area; and controlling the starting of the photographing of said area while said photographic means is passing over said area.

11. The method defined in claim 10 further characterized by the step of stopping the movement of said record material with respect to said photographic means when said photographic means is not directed toward said area.

12. Surveying apparatus of the class described which includes: a vehicle adapted to be projected over the area to be surveyed and caused to rotate about a spin axis passing through said vehicle as said vehicle passes over said body; sensing apparatus operable to detect the rate of spin of said vehicle; and selectively operable control means operable to change the moment of inertia of said vehicle with respect to said spin axis, whereby the speed of rotation of said vehicle about said spin axis may be controlled.

References Cited in the file of this patent
UNITED STATES PATENTS

| | | |
|---|---|---|
| 1,102,653 | Goddard | July 7, 1914 |
| 1,449,295 | Richards | Mar. 20, 1923 |
| 1,751,774 | Trullinger | Mar. 25, 1930 |
| 2,328,847 | Place | Sept. 7, 1943 |
| 2,804,823 | Jablansky | Sept. 3, 1957 |
| 2,835,107 | Ward | May 20, 1958 |

UNITED STATES PATENT OFFICE
CERTIFICATE OF CORRECTION

Patent No. 3,143,048                                August 4, 1964

Merton E. Davies

It is hereby certified that error appears in the above numbered patent requiring correction and that the said Letters Patent should read as corrected below.

Column 7, line 34, for "selectivity" read -- selectively --.

Signed and sealed this 1st day of December 1964.

(SEAL)
Attest:

ERNEST W. SWIDER                                EDWARD J. BRENNER
Attesting Officer                                    Commissioner of Patents